(12) United States Patent
Johnson

(10) Patent No.: US 6,427,822 B1
(45) Date of Patent: Aug. 6, 2002

(54) PAPER CHUTE

(76) Inventor: Peggy A. L. Johnson, 7058 Harne Ct., Rancho Cucamonga, CA (US) 91739

( * ) Notice: Subject to any disclaimer, the term of this patent is extended or adjusted under 35 U.S.C. 154(b) by 0 days.

(21) Appl. No.: 09/910,194

(22) Filed: Jul. 19, 2001

(51) Int. Cl.7 .................................................. B65G 11/00
(52) U.S. Cl. ........................................ 193/2 R; 193/34
(58) Field of Search .............................. 193/2 R, 33, 34

(56) References Cited

U.S. PATENT DOCUMENTS

| | | | | |
|---|---|---|---|---|
| 2,571,335 A | * | 10/1951 | Browne | 193/2 R |
| 3,770,334 A | * | 11/1973 | Weber | 312/223 |
| 4,694,947 A | * | 9/1987 | Nineberg et al. | 193/34 |
| 5,020,651 A | * | 6/1991 | Lockett | 193/25 R |
| 5,284,268 A | * | 2/1994 | Marman et al. | 220/23.83 |

* cited by examiner

Primary Examiner—James R. Bidwell
(74) Attorney, Agent, or Firm—Joseph N. Breaux

(57) ABSTRACT

A paper chute that is attachable to a desk or the like that includes an intake chute positionable the level of the desk and a discharge chute which is orientable toward the opening of a trash can so that papers and the like thrown into the chute opening are directed into the trash can.

1 Claim, 2 Drawing Sheets

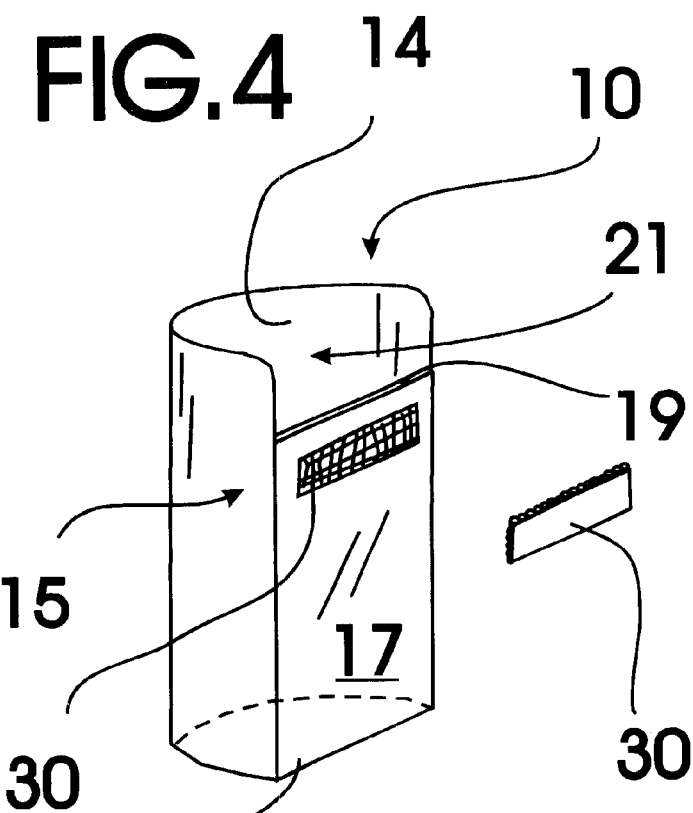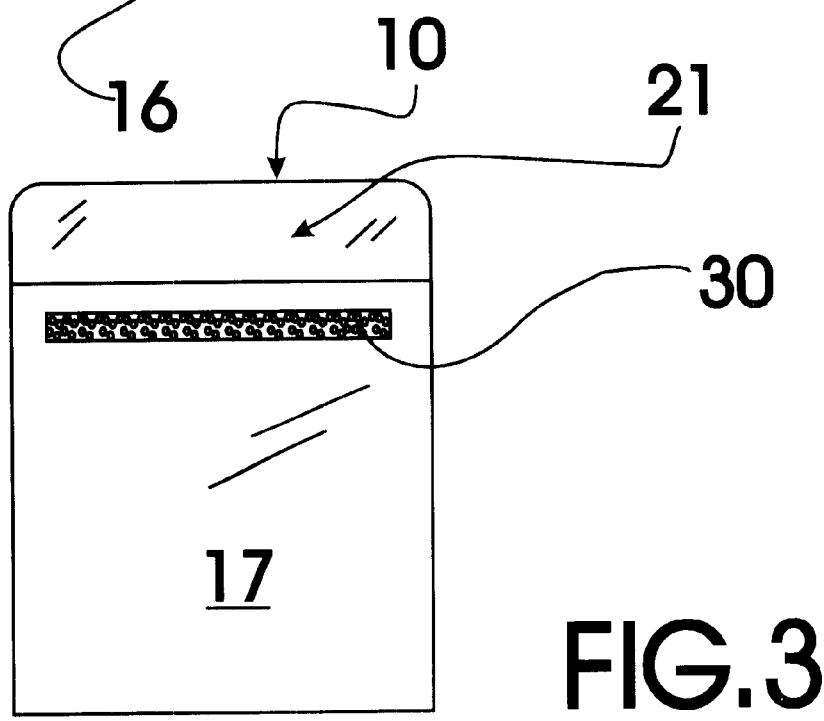

PAPER CHUTE

TECHNICAL FIELD

The present invention relates to desk accessories and more particularly to a desk accessory including an attachable chute structure that has a chute receiving opening positioned above the level of the desk surface and a discharge chute opening that is positionable and directable toward the opening of a trash can so that the user can discard paperwork without the possibility of missing the trash can resulting in the user having to repeatedly lean over to lift discarded papers placing unnecessary strain on the user's back.

BACKGROUND OF INVENTION

Many people who deal with a lot of paperwork must discard papers because of errors or various other reasons. If the trash can is not in a convenient location, the discarded papers often miss the trash can and end up on the floor where they must be picked up by bending over and lifting them off of the ground. This can be particularly difficult for people with limited movement abilities such as people having back problems and wheelchair bound workers. It would be a benefit, therefore, to have a paper chute which could be attached to the desk and which would automatically funnel and direct the discarded papers into the trash can to insure that the discarded papers did not end up on the floor requiring the user to pick up the paper.

SUMMARY OF INVENTION

It is thus an object of the invention to provide a paper chute that includes an attachable chute structure that has a chute receiving opening positioned above the level of the desk surface and a discharge chute opening that is positionable and directable toward the opening of a trash can so that the user can discard paperwork without the possibility of missing the trash can resulting in the user having to repeatedly lean over to lift discarded papers placing unnecessary strain on the user's back.

Accordingly, a paper chute is provided. The paper chute includes an attachable chute structure that has a chute receiving opening positioned above the level of the desk surface and a discharge chute opening that is positionable and directable toward the opening of a trash can so that the user can discard paperwork without the possibility of missing the trash can resulting in the user having to repeatedly lean over to lift discarded papers placing unnecessary strain on the user's back.

BRIEF DESCRIPTION OF DRAWINGS

For a further understanding of the nature and objects of the resent invention, reference should be had to the following detailed description, taken in conjunction with the accompanying drawings, in which like elements are given the same or analogous reference numbers and wherein:

FIG. 3 shows the back of the exemplary paper chute of FIG. 1 including one of the Velcro® two-part adhesive backed hook and pile fastener attachment strips used to detachably connect the chute to a desk in a manner to allow the chute to be detached for cleaning purposes and the like.

FIG. 4 shows a perspective view of the exemplary paper chute of FIG. 1 and both of the Velcro® two-part adhesive backed hook and pile fastener attachment strips.

EXEMPLARY EMBODIMENTS

Figure 1:
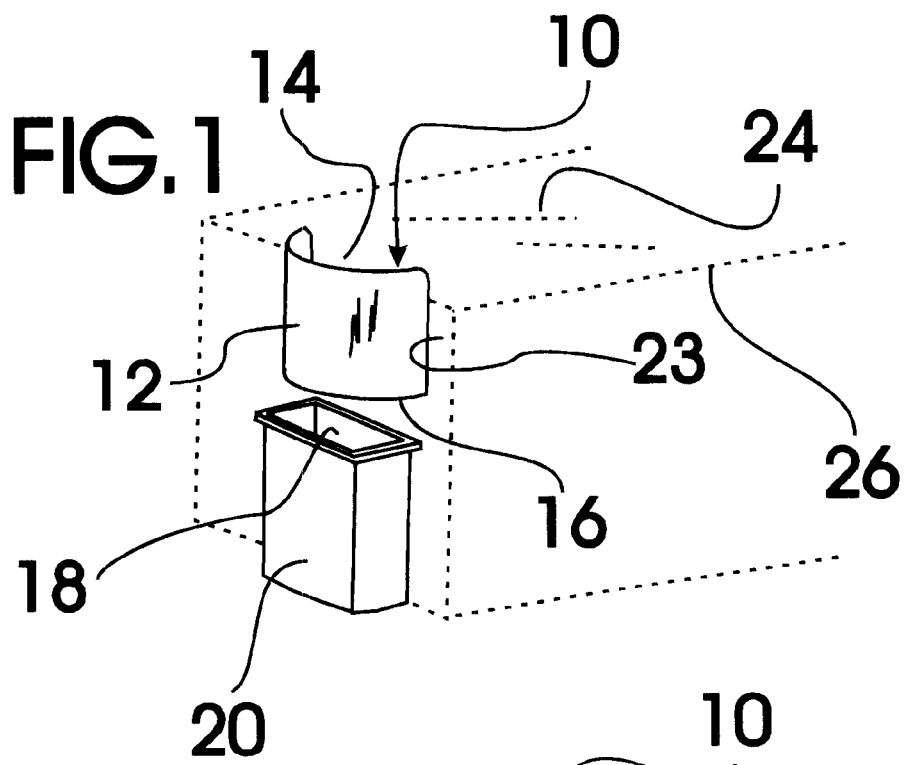
FIG. 1 shows an exemplar embodiment of the paper chute of the present invention attached to a representative desk and positioned above a representative trash can.
Figure 2:
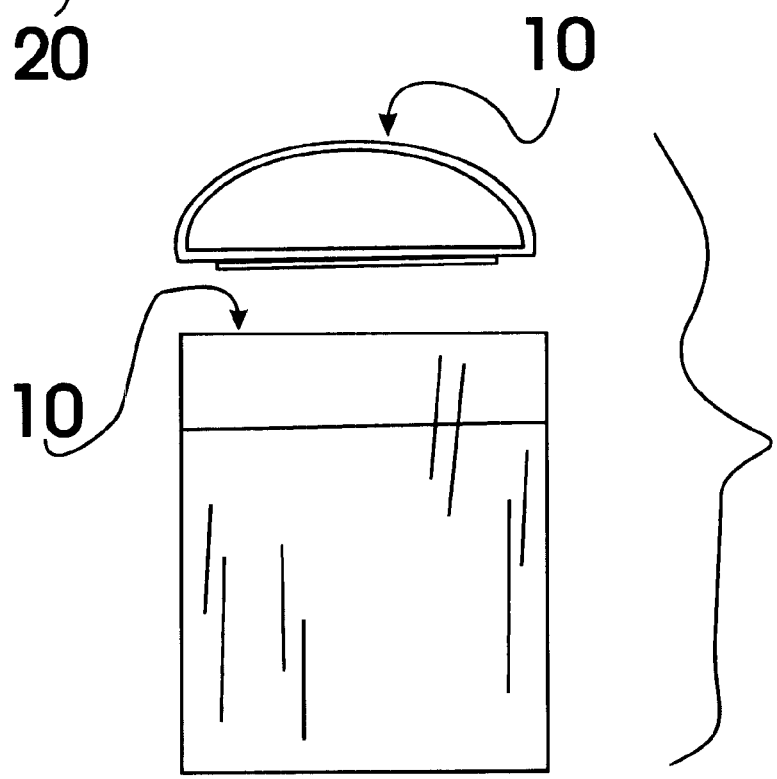
FIG. 2 shows a top and front view of an exemplary paper chute of the present invention.

FIGS. 1 through 4 show various aspects of an exemplary embodiment of the paper chute of the present invention generally designated 10. Paper chute 10 has a semi-conical shaped outer surface 12 and has a chute receiving opening 14 provided at a top end thereof and a discharge chute 16 provided at a bottom surface thereof that is used to direct waste paper into a top opening 18 of a trash can 20 during use. Semi-conical shaped outer surface 12 includes a curved outer surface portion 15 and a planar outer surface portion 17. A top portion of the curved outer surface portion 15 extends past a top edge 19 of planar outer surface portion 17 to form a curved paper guide structure 21. Chute receiving opening 14 is defined by curved paper guide structure 21 and top edge 19. Hook and pile strips 30 are provided such that one strip 30 is secured to planar surface 17 and the other strip 30 securable to a sidewall 23 of the desk 26 such that paper chute 10 is securable to sidewall 23 in a manner such that chute receiving opening 14 is held above a top surface 24 of desk 26 so that the user can easily discard papers into trash can 20 as desired. Hook and pile strips 30 are used as the attachment mechanism in the exemplary embodiment to allow for detachment of paper chute 10 for cleaning and the like. However, if desired, other detachable twopart fasteners could be utilized as well as permanent attachment mechanisms including tacks, double-sided tape and the like could be utilized.

It can be seen from the preceding description that a paper chute has been provided.

It is noted that the embodiment of the paper chute described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A waste paper chute that is attachable to a side wall of a desk structure having a work surface and which provides a chute structure defining a chute receiving opening for directing the trajectory of waste paper and the like toward a trash container placed adjacent to the sidewall; the waste paper chute comprising:

a chute structure; and an attachment mechanism in connection with the chute structure for attaching the chute structure to a desk structure;

the chute structure having a semi-conical shaped outer surface defining a chute between a chute receiving opening and a discharge chute opening;

the semi-conical shaped outer surface having a curved outer surface portion and a planar outer surface portion;

a top portion of the curved outer surface portion extending past a top edge of the planar outer surface portion to form a paper guide structure;

the paper guide structure and the top edge of the planar outer surface portion defining the chute receiving opening;

the attachment mechanism including a first fastener part in connection with the planar outer surface portion and a second fastener part adapted to be secured to a sidewall of a desk structure having a work surface in a manner such that the chute receiving opening of the chute structure extends above the work surface when the second fastener part is secured to the sidewall.

* * * * *